(12) United States Patent
Xia et al.

(10) Patent No.: US 10,473,860 B1
(45) Date of Patent: Nov. 12, 2019

(54) COMPACT DEVICES FOR MULTIPLEXING APPLICATIONS

(71) Applicant: ALLIANCE FIBER OPTIC PRODUCTS, INC., Sunnyvale, CA (US)

(72) Inventors: Chen Xia, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 16/142,513

(22) Filed: Sep. 26, 2018

Related U.S. Application Data

(60) Provisional application No. 62/670,267, filed on May 11, 2018.

(51) Int. Cl.
 *G02B 6/26* (2006.01)
 *G02B 6/293* (2006.01)

(52) U.S. Cl.
 CPC ......... *G02B 6/262* (2013.01); *G02B 6/29359* (2013.01); *G02B 6/29368* (2013.01); *G02B 6/29382* (2013.01)

(58) Field of Classification Search
 None
 See application file for complete search history.

(56) References Cited

U.S. PATENT DOCUMENTS

| | | | | |
|---|---|---|---|---|
| 4,255,016 A * | 3/1981 | Borsuk | ................. | G02B 6/262 385/73 |
| 5,129,022 A * | 7/1992 | Marcus | ................. | G01D 5/268 385/47 |
| 5,263,106 A * | 11/1993 | Rosson | ............... | G02B 6/3874 385/140 |
| 5,706,379 A * | 1/1998 | Serafini | ................. | G02B 6/264 385/140 |

(Continued)

FOREIGN PATENT DOCUMENTS

| CN | 201159782 Y | 12/2008 |
|---|---|---|
| CN | 101794022 B | 9/2011 |

(Continued)

OTHER PUBLICATIONS

International Search Report and Written Opinion PCT/US2019/029585 dated Jul. 11, 2019, 12 Pgs.

*Primary Examiner* — Michael Stahl
(74) *Attorney, Agent, or Firm* — Adam R. Weeks

(57) ABSTRACT

Disclosed is a compact device for wavelength-division multiplexing applications. In particular, disclosed is a device that includes a housing and a core at least partially positioned within the housing. The core includes a first single fiber stub, a second single fiber stub, and at least one functional layer positioned between a first fiber of the first single fiber stub and a second fiber of the second single fiber stub. The at least one functional layer is configured to: (i) permit routing of a transmission signal of a multiplexed signal along an optical path from the first fiber stub to the (Continued)

second fiber stub, and (ii) prevent routing of a non-transmission signal of the multiplexed signal along the optical path from the first fiber stub to the second fiber stub. A distance between a first ferrule of the first fiber stub and a second ferrule of the second fiber stub is less than about 0.05 mm.

24 Claims, 6 Drawing Sheets

(56) References Cited

U.S. PATENT DOCUMENTS

| | | | |
|---|---|---|---|
| 6,280,099 B1 * | 8/2001 | Wu | G02B 6/2937 385/70 |
| 6,434,283 B2 * | 8/2002 | Frederick | F16H 57/04 385/11 |
| 6,493,484 B1 * | 12/2002 | Deri | G02B 6/29368 385/27 |
| 6,712,523 B2 * | 3/2004 | Zimmel | G02B 6/266 385/55 |
| 6,999,661 B2 * | 2/2006 | Plickert | G02B 6/29368 385/27 |
| 8,538,209 B1 | 9/2013 | Li | |
| 9,229,170 B1 | 1/2016 | Wang et al. | |
| 9,551,831 B1 | 1/2017 | Peng et al. | |
| 2002/0181888 A1 | 12/2002 | Zimmel | |
| 2008/0166094 A1 | 7/2008 | Bookbinder et al. | |
| 2009/0169163 A1 | 7/2009 | Abbott, III et al. | |

FOREIGN PATENT DOCUMENTS

| | | |
|---|---|---|
| CN | 103676014 A | 3/2014 |
| CN | 203849455 U | 9/2014 |
| EP | 957379 A2 | 11/1999 |
| JP | 6-250017 A * | 9/1994 |
| JP | 11-211917 A * | 8/1999 |

* cited by examiner

COMPACT DEVICES FOR MULTIPLEXING APPLICATIONS

CROSS-REFERENCE TO RELATED APPLICATION

This application claims the benefit of priority of U.S. Provisional Application Ser. No. 62/670,267, filed May 11, 2018, the content of which is relied upon and incorporated herein by reference in its entirety.

BACKGROUND

The disclosure relates to wavelength-division multiplexing and demultiplexing, and more particularly to compact two-port devices.

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple wavelengths of light into a single channel, WDM assemblies and associated devices can be used as components in an optical network, such as a passive optical network (PON).

In certain applications, a three-port device may be used as an optical add-and-drop multiplexer (OADM). However, in other applications, the three-port device is too large and/or too complicated to manufacture. Further, in some applications, long fibers at port ends of the three-port device require extra care to avoid damage. For some applications, a two-port device may be used instead.

FIG. 1 is a cross-sectional top view of a two-port device 100. The two-port device 100 includes a first subassembly 102(1) and a second subassembly 102(2) in optical communication with the first subassembly 102(1). The first subassembly 102(1) includes a first port 104(1), a first ferrule 105(1) (e.g., ceramic), a first fiber optic collimator 106(1) having a first capillary 108(1) (e.g., glass) and a first fiber 110(1), and the first subassembly 102(1) further including a first collimating element 112(1) (e.g., C-lens or collimating lens, G-lens or gradient-index (GRIN) lens). The first fiber 110(1) is positioned within the first capillary 108(1). Similarly, the second subassembly 102(2) includes a second port 104(2), a second ferrule 105(2) (e.g., ceramic), a second fiber optic collimator 106(2) having a second capillary 108(2) (e.g., glass) and a second fiber 110(2), and the second subassembly 102(2) further including a second collimating element 112(2) (e.g., C-lens or collimating lens, G-lens or gradient-index (GRIN) lens). The second fiber 110(2) is positioned within the second capillary 108(2). A filter 114 having a thickness T1 is positioned between the first collimator 106(1) (and the first collimating element 112(1)) and the second collimator 106(2) (and the second collimating element 112(2)). The first collimating element 112(1) and the second collimating element 112(2) are required in order to transmit a multiplexed signal from the first subassembly 102(1) to the second subassembly 102(2) due to the thickness T1 of the filter 114, a first air gap G1(1) between the first collimating element 112(1) and the filter 114, and a second air gap G1(2) between the filter 114 and the second collimating element 112(2). In other words, as a multiplexed signal is transmitted between the first port 104(1) and the second port 104(2), the multiplexed signal must travel through the first collimating element 112(1) and the second collimating element 112(2).

FIG. 2 is a cross-sectional top view of a two-port device 200. The two-port device 200 includes a first subassembly 202(1) and a second subassembly 202(2) in optical communication with the first subassembly 202(2). The first subassembly 202 includes a first port 204(1), a first fiber optic collimator 206(1) having a first ferrule 208(1) and a first fiber 210(1) with a first collimating element 212(1) (e.g., graded-index fiber segment), and a filter 214. The first fiber 210(1) is positioned within the first ferrule 208(1). Similarly, the second subassembly 202(2) includes a second port 204(2), a second fiber optic collimator 206(2) having a second ferrule 208(2) and a second fiber 210(2) with a second collimating element 212(2) (e.g., graded-index fiber segment). The second fiber 210(2) is positioned within the second ferrule 208(2). A filter 214 having a thickness T2 is positioned between the first ferrule 208(1) (and first collimating element 212(1)) and the second ferrule 208(2) (and the second collimating element 212(2)). The first collimating element 212(1) and the second collimating element 212(2) are required in order to transmit a multiplexed signal from the first subassembly 202(1) to the second subassembly 202(2) due to the thickness T2 of the filter 214 and an air gap G2 between the filter 214 and the second ferrule 208(2). In other words, as a multiplexed signal is transmitted between the first port 204(1) and the second port 204(2), the multiplexed signal must travel through the first collimating element 212(1) and the second collimating element 212(2).

Referring to FIGS. 1 and 2, as noted above, these two-port WDM devices 100, 200 require collimating elements in the light path to function properly (among other reasons (e.g., for economic reasons, engineering reasons, mass-production reasons, etc.)) which adds to the size, manufacturing complexity, and/or cost, etc.

Accordingly, there is a need for two-port devices that are reliable, cost effective, and/or user friendly, and/or have a compact form-factor, easy replication, and/or versatility.

No admission is made that any reference cited herein constitutes prior art. Applicant expressly reserves the right to challenge the accuracy and pertinency of any cited documents.

SUMMARY

Disclosed herein are compact devices for wavelength-division multiplexing. In particular, disclosed is a two-port device with a core including a first single fiber stub, a second single fiber stub, and at least one functional layer. Each single fiber stub includes a ferrule and a fiber at least partially positioned within the ferrule. A first fiber of the first single fiber stub is configured for optical communication of a multiplexed signal including a transmission signal and a non-transmission signal (also called a demultiplexed signal). A second fiber of the second single fiber stub is configured for optical communication of the transmission signal. The functional layer is positioned between the first fiber and the second fiber and is configured to: (i) permit routing of the transmission signal of the multiplexed signal along an optical path from the first fiber to the second fiber, and (ii) prevent routing of the non-transmission signal of the multiplexed signal along the optical path from the first fiber to the second fiber. A distance between the first ferrule and the second ferrule is less than 0.05 mm. Accordingly, the two-port device has a compact form factor and easy manufacturability for wavelength-division multiplexing applications.

An additional embodiment of the disclosure relates to a two-port device including at least one functional layer positioned between a first fiber and a second fiber. The at least one functional layer is configured to: (i) permit routing of a transmission signal of a multiplexed signal along an optical path from the first fiber to the second fiber, and (ii) prevent routing of a non-transmission signal of the multiplexed signal along the optical path from the first fiber to the second fiber. A distance between the first fiber and the second fiber is less than 0.05 mm.

An additional embodiment of the disclosure relates to a method of forming a two-port device. The method includes positioning a first ferrule of a first single fiber stub adjacent to a first side of a functional layer and positioning a second ferrule of a second single fiber stub adjacent to a second side of the functional layer such that a distance between the first ferrule and the second ferrule is less than 0.05 mm and such that the at least one functional layer is configured to: (i) permit routing of a transmission signal of a multiplexed signal from a first fiber within the first ferrule of the first single fiber stub to a second fiber within the second ferrule of the second single fiber stub, and (ii) prevent routing of a non-transmission signal of the multiplexed signal from the first fiber to the second fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
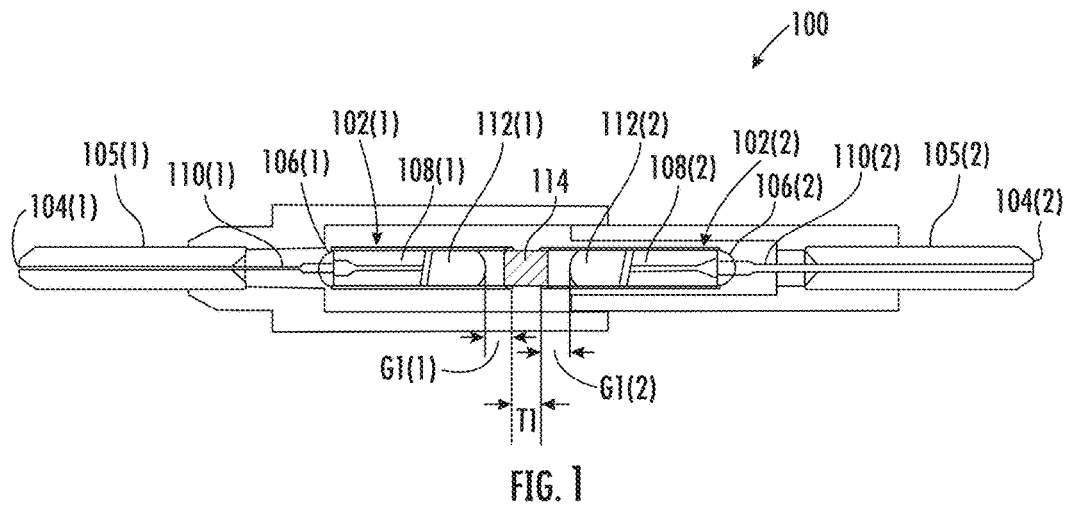
FIG. 1 is a cross-sectional top view of a two-port wavelength division multiplexing (WDM) device with collimating lenses.
Figure 2:
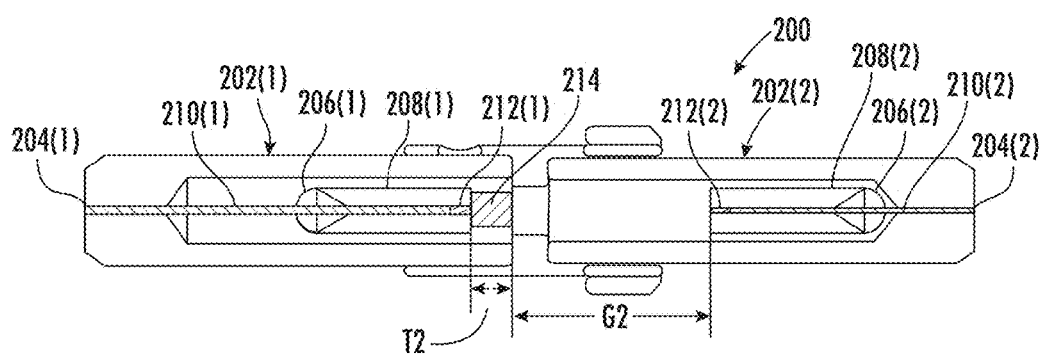
FIG. 2 is a cross-sectional top view of a two-port WDM device with collimating fiber segments.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," "coplanar," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working examples.

As used herein, the terms "optical communication," "in optical communication," and the like mean, with respect to a group of elements, that the elements are arranged such that optical signals are passively or actively transmittable therebetween via a medium, such as, but not limited to, an optical fiber, one or more ports or connectors, free space, index-matching material (e.g., structure or gel), reflective surface, or other light directing or transmitting means.

As used herein, the term "port" means an interface for actively or passively passing (e.g., receiving, transmitting, or both receiving and transmitting) optical signals. A port may include, by way of non-limiting examples, one or more fiber optic connectors, optical splices, optical fibers, free-space, ferrules, or a combination of the foregoing.

As used herein, the terms "stub" and "pigtail" mean a one or more optical fibers in a ferrule. The fiber or fibers may extend from the ferrule and may each be terminated with a fiber optical connector but are not required to be terminated a fiber optic connector. As used herein, the term "single fiber stub" means a single optical fiber in a ferrule.

Further, as used herein, it is intended that term "optical fibers" and similar terms include all types of single mode and multi-mode light waveguides, including optical fibers that may be glass core, plastic core, uncoated, coated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Disclosed herein are compact two-port devices for use in wavelength-division multiplexing devices. In particular, disclosed is a two-port device with a core including a first single fiber stub, a second single fiber stub, and at least one functional layer. Each single fiber stub includes a ferrule and a fiber at least partially positioned within the ferrule. A first fiber of the first single fiber stub is configured for optical communication of a multiplexed signal including a transmission signal and a non-transmission signal (also called a demultiplexed signal). A second fiber of the second single fiber stub is configured for optical communication of the transmission signal. The functional layer is positioned between the first fiber and the second fiber and is configured to: (i) permit routing of the transmission signal of the multiplexed signal along an optical path from the first fiber to the second fiber, and (ii) prevent routing of the non-transmission signal of the multiplexed signal along the optical path from the first fiber to the second fiber. A distance between the first ferrule and the second ferrule is less than 0.05 mm. Accordingly, the two-port device has a compact form factor and easy manufacturability for wavelength-division multiplexing applications.

Figure 3A:
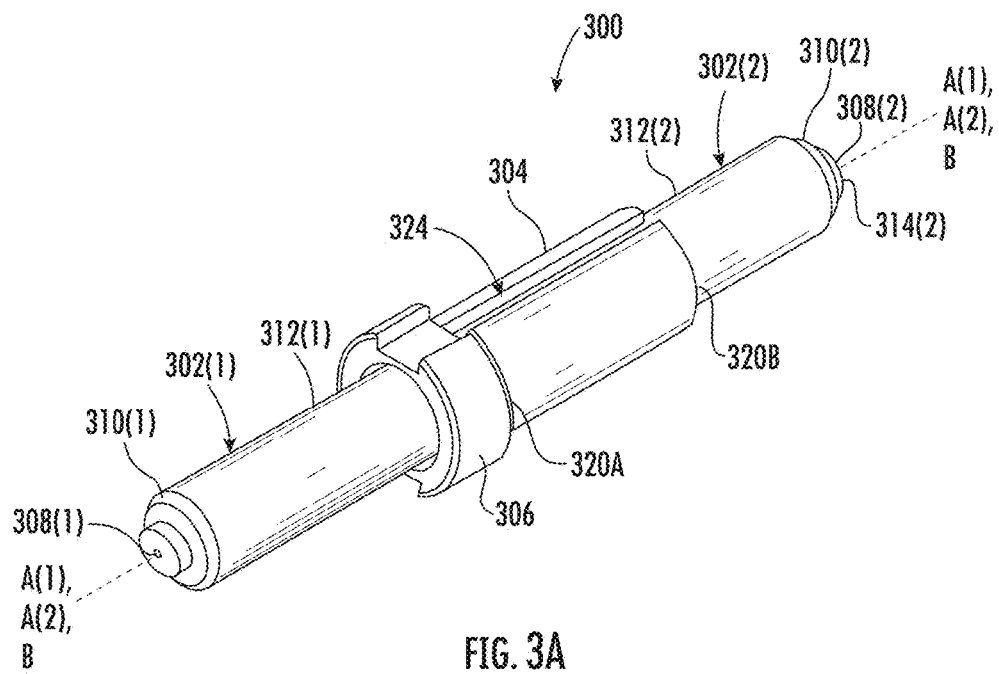
FIG. 3A is a perspective view of a core of an embodiment of a two-port device devoid of collimating elements and with a thin-film filter less than 0.05 mm thick.

FIG. 3A is a perspective view of a core 300 of a two-port device (see, e.g., the two-port device 600 of FIG. 6) with a thin-film filter and devoid of collimating elements such as collimating lenses, collimating fiber segments, or other collimating elements. As used herein, the term "devoid of collimating elements" means that the device does not include an additional device in the core for narrowing the optical signals between the first and second fibers of the first and second first and second fiber stubs. The core 300 (may also be referred to as a fiber optic core, WDM core, core assembly, etc.) includes a first subassembly 302(1) (e.g., first WDM subassembly), a second subassembly 302(2) (e.g., second WDM subassembly), a connector sleeve 304, a mounting ring 306 (e.g., metal ring), and a functional layer 307 (e.g., WDM filter) (FIG. 3B) positioned in the connector sleeve 304 between the first subassembly 302(1) and the second subassembly 302(2).

Figure 3B:
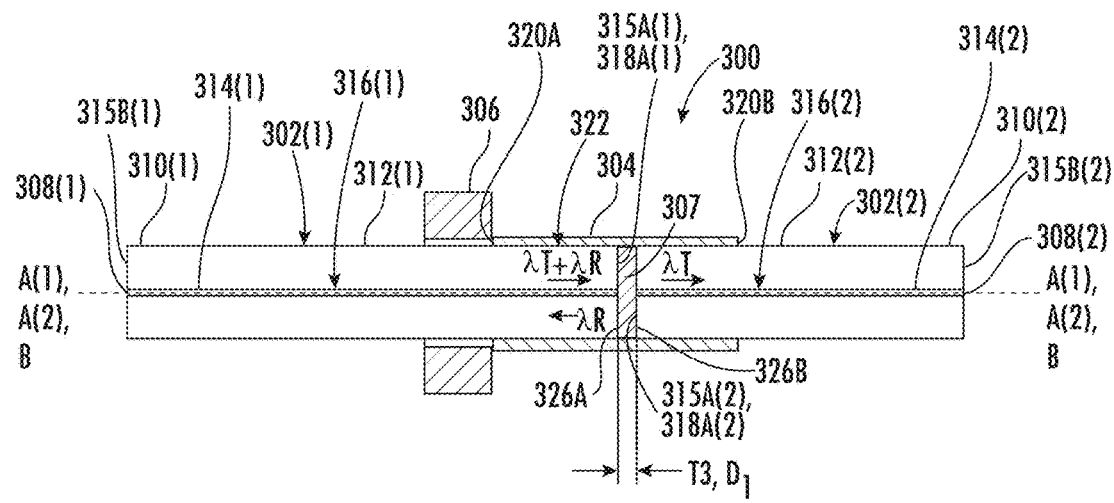
FIG. 3B is a cross-sectional top view of the core of FIG. 3A.

As shown in FIG. 3B, the functional layer 307 may be a thin-film-filter having a thickness T3 of less than 50 microns. As used herein, the term "functional layer" means an element capable of permitting passage through the element of certain optical signals and preventing passage through the element of other optical signals. Examples of a functional layer include thin-film WDM filters, WDM layers, tap filters, and tap layers. In certain embodiments, the functional layer 307 has a thickness T3 of less than 30 microns. In other embodiments, the functional layer 307 has a thickness T3 of less than 15 microns. In yet other embodiments, the functional layer 307 has a thickness T3 of less than 10 microns. In still other embodiments, the functional layer 307 has a thickness T3 of less than 1 micron. In certain embodiments, the functional layer 307 has a thickness T3 between about 1 micron and about 50 microns, between about 1 micron and about 30 microns, between about 1 microns and about 15 microns, or between about 1 micron and about 10 microns. In certain embodiments, the functional layer 307 is a WDM layer or WDM filter (e.g., for wavelength management) having a passband to filter a multiplexed signal by wavelength. In certain embodiments, the functional layer 307 is a tap layer or tap filter (e.g., for optical intensity management) to filter the multiplexed signal by optical intensity or power. In certain embodiments, the functional layer 307 may include multiple functional layers. In certain embodiments, the functional layer 307 could be in the form of either a very thin filter or specific film peeled off from a filter in certain technology, or a deposited layer (e.g., by direct deposition) onto the first ferrule 312(1) and/or the second ferrule 312(2). For example, in certain embodiments, the functional layer 307 is peeled off (e.g., from a filter) and applied to the first ferrule 312(1) and/or the second ferrule 312(2). In certain embodiments, the functional layer 307 is deposited onto the first ferrule 312(1) and/or the second ferrule 312(2). In certain embodiments, the functional layer 307 may be soaked in between the first ferrule 312(1) and the second ferrule 312(2) in index-matching gel, or other UV epoxy, or an air layer.

Referring now to FIG. 3B, the first subassembly 302(1) includes a first port 308(1), a first single fiber stub 310(1) having a first ferrule 312(1), and a first fiber 314(1) (may also be referred to herein as a first optical fiber) at least partially positioned within the first ferrule 312(1). In particular, the first ferrule 312(1) includes a first medial end 315A(1), a first distal end 315B(1) opposite the first medial end 315A(1), and a first channel 316(1) extending therebetween. A first end face 318A(1) at the first medial end 315A(1) of the first ferrule 312(1) is generally perpendicular to a first axis A(1) of the first ferrule 312(1) (and the first fiber 314(1)).

Similarly, the second subassembly 302(2) includes a second port 308(2), a second single fiber stub 310(2) having a second ferrule 312(2), and a second fiber 314(2) (may also be referred to herein as a second optical fiber) at least partially positioned within the second ferrule 312(2). In particular, the second ferrule 312(2) includes a second medial end 315A(2), a second distal end 315B(2) opposite the second medial end 315A(2), and a second channel 316(2) extending therebetween. A second end face 318A(2) at the second medial end 315A(2) of the second ferrule 312(2) is generally perpendicular to a second axis A(2) of the second ferrule 312(2) (and the second fiber 314(2)).

The first and second ferrules 312(1), 312(2) may be made of ceramic, metal, glass, plastic, etc., depending on the requirements for robustness and/or flexibility. A securing element (e.g., adhesive, a mechanical fastener, etc.) can be disposed around the first and second fibers 314(1), 314(2) at the distal ends of the first and second ferrules 312(1), 312(2) to secure the first and second fibers 314(1), 314(2) to the first and second ferrules 312(1), 312(2). The first fiber 314(1) is in optical communication with the first port 308(1), and the second fiber 314(2) is in optical communication with the second port 308(2).

The connector sleeve 304 includes a first end 320A, a second end 320B opposite the first end 320A, and a sleeve channel 322 extending therebetween along a central axis B. Further, the connector sleeve 304 includes a slit 324 (FIG. 3A) extending between the first end 320A and the second end 320B along (but offset from) the central axis B. In certain embodiments, the connector sleeve 304 is made of metal, ceramic, and/or plastic, etc.

At least a portion of the first ferrule 312(1) and the first fiber 314(1) is positioned within the sleeve channel 322 at the first end 320A of the connector sleeve 304, and at least a portion of the second ferrule 312(2) and the second fiber 314(2) is positioned within the sleeve channel 322 at the second end 320B of the connector sleeve 304. The connector sleeve 304 is configured to frictionally engage the first ferrule 312(1) and the second ferrule 312(2). In particular, the slit 324 (FIG. 3A) allows the connector sleeve 304 to expand to frictionally receive the first ferrule 312(1) and the second ferrule 312(2). In the embodiments illustrated in FIGS. 3A and 3B, the first fiber 314(1) is axially aligned with the second fiber 314(2) and the first subassembly 302(1) is in optical communication with the second subassembly 302(2).

The mounting ring 306 is positioned around the first ferrule 312(1) and is configured for mounting the core 300 within a housing of the two-port device (see, e.g., the two-port device 600 of FIG. 6). It is noted that the mounting ring 306 could alternatively or additionally be positioned around the second ferrule 312(2).

The functional layer 307 is positioned between the first medial end 315A(1) of the first ferrule 312(1) (and the first fiber 314(1)) and the second medial end 315A(2) of the second ferrule 312(2) (and the second fiber 314(2)). The functional layer 307 includes a first side 326A and a second side 326B opposite the first side 326A. In certain embodiments, the first medial end 315A(1) of the first ferrule 312(1) (and the first fiber 314(1)) abuts (e.g., contacts) the first side 326A of the functional layer 307, and/or the second medial end 315A(2) of the second ferrule 312(2) (and the second fiber 314(2)) abuts (e.g., contacts) the second side 326B of the functional layer 307. In certain embodiments, the functional layer 307 is attached to one or both of the first and second ferrules 312(1), 312(2) by laser welding, glass welding, or adhesive (e.g., epoxy, glue), or a combination of any of the foregoing.

As a result, the distance between the first medial end 315A(1) of the first ferrule 312(1) (and the first fiber 314(1)) and the second medial end 315A(2) of the second ferrule 312(2) (and the second fiber 314(2)) is minimized to about the thickness T3 of the functional layer 307. In certain embodiments, the distance between the first medial end 315A(1) of the first ferrule 312(1) (and the first fiber 314(1)) and the second medial end 315A(2) of the second ferrule 312(2) (and the second fiber 314(2)) is about the same as the thickness T3 of the functional layer 307. In some embodiments, the distance T3 between the first medial end 315A(1) of the first ferrule 312(1) (and the first fiber 314(1)) and the second medial end 315A(2) of the second ferrule 312(2) (and the second fiber 314(2)) is less than about 50 microns. In certain embodiments, the distance T3 is less than about 30 microns. In other embodiments, the distance T3 is less than 15 microns. In other embodiments, the distance T3 is less than 10 microns. In yet other embodiments, the distance T3 is less than 1 micron. In certain embodiments, the functional layer 307 has a thickness T3 between about 1 micron and about 50 microns. In other embodiments, the functional layer 307 has a thickness T3 between about 1 and about 30 microns. In yet other embodiments, the functional layer 307 has a thickness T3 between about 1 and about 15 microns. In certain embodiments, the functional layer 307 has a thickness T3 between about 1 and about 10 microns. Due to the small distance T3 between the first medial end 315A(1) of the first ferrule 312(1) (and the first fiber 314(1)) and the second medial end 315A(2) of the second ferrule 312(2) (and the second fiber 314(2)), a collimating element is not required for the propagation of an optical signal between the first fiber 314(1) and the second fiber 314(2). Thus, the optical light path between the first and second fibers 314(1), 314(2) within the core 300 and through the functional layer 307 is devoid of a collimating element, such as a collimating lens or a gradient index fiber segment. In other words, the optical light path between the first and second fibers 314(1), 314(2) is devoid of a collimating element.

In operation, as an example, a multiplexed optical signal, including a first signal (also called a first sub-signal of the multiplexed signal) and a second signal (also called a second sub-signal of the multiplexed signal), is transmitted to the first port 308(1). The first signal may be a transmission signal $\kappa_T$ (e.g., data signal) and the second signal may be a reflection signal $\lambda_R$ (e.g., monitoring signal, blocking signal, etc.). The functional layer 307 is configured to allow propagation of the first signal (the transmission signal $\lambda_T$) from the first fiber 314(1) through the functional layer 307 and then through the second fiber 314(2) to the second port 308(2). The functional layer 307 is configured to block or reflect the second signal (the reflection signal $\lambda_R$) back down the first fiber 314(1). The second signal may then be directed to an optical element such as an optical time-domain reflectometer (OTDR). In other words, the functional layer 307 is configured to reflect at least one of the signals (e.g., the second signal) of the multiplexed signal from the first fiber 314(1) in a reverse direction back within the first fiber 314(1). Thus, in some embodiments the functional layer 307 is configured to route part of a multiplexed signal between the first port 308(1) and second port 308(2).

Thus, in some embodiments the functional layer 307 is positioned between the first fiber 314(1) and the second fiber 314(2) and is configured to: (i) permit routing of the transmission signal (e.g., the first signal or transmission signal $\lambda_T$) of the multiplexed signal along an optical path from the first fiber 314(1) to the second fiber 314(2), and (ii) prevent routing of the non-transmission signal (also called a demultiplexed signal, a second signal or reflection signal $\lambda_R$) of the multiplexed signal along the optical path from the first fiber 314(1) to the second fiber 314(2). As discussed above, a distance $D_1$ between the first ferrule 312(1) and the second ferrule 312(2) may be less than about 0.05 mm, less than about 0.03 mm, less than about 0.01 mm, or less than about 0.001 mm.

In certain embodiments, the core 300 includes no more than two ports 308(1), 308(2). In other words, in certain embodiments, the core 300 includes only a first port 308(1) and a second port 308(2). It is noted that the core 300 is bi-directional, and the signal multiplexing and/or demultiplexing works the same when propagated from the first port 308(1) to the second port 308(2) or from the second port 308(2) to the first port 308(1).

In certain embodiments (see e.g., FIG. 5 below), the functional layer 307 is configured to reflect at least one of the signals (sub-signals) of the multiplexed signal out of an optical light path between the first fiber 314(1) and the second fiber 314(2).

In the embodiment illustrated in FIG. 3B, the functional layer 307, the first end face 318A(1) of the first ferrule 312(1), and the second end face 318A(2) of the second ferrule 312(2) are substantially perpendicular to the first axis A(1) of the first ferrule 312(1) (and first fiber 314(1)) and the second axis A(2) of the second ferrule 312(2) (and second fiber 314(2)). As a result, when the reflection signal $\lambda_R$ is reflected by the functional layer 307, the reflection signal $\lambda_R$ is transmitted back through the first fiber 314(1). In certain embodiments, one or more two-port devices (e.g., OTDR) are used to monitor network performance by monitoring these reflection signals $\lambda_R$. The configuration of core 300 can be used for signal monitoring, signal blocking, and/or signal attenuation, etc. For example, the two-port device could be used to monitor fiber quality, monitor fiber performance (e.g., if a fiber has been cut or otherwise damaged in the field), etc. The first fiber 314(1) within the first ferrule 312(1) is axially aligned with the second fiber 314(2) within the second ferrule 312(2) to propagate the transmission signal $\lambda_T$ between the first fiber 314(1) and the second fiber 314(2).

Figure 4A:
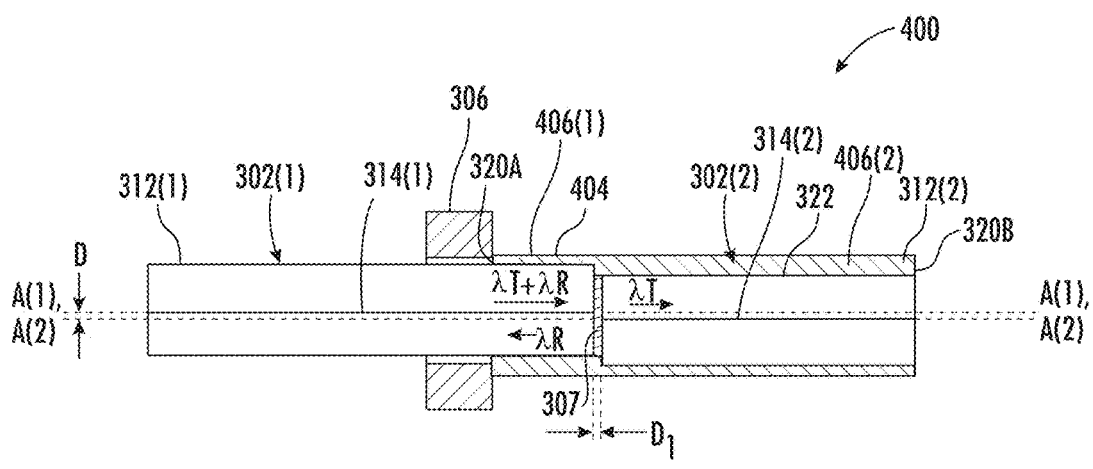
FIG. 4A is a cross-sectional top view of another embodiment of the core of FIGS. 3A and 3B with radially offset alignment of the first and second optical fibers.

FIG. 4A is a cross-sectional top view of another embodiment of a core 400 with radially offset alignment of the first and second optical fibers 314(1), 314(2). The core 400 is similar to the core 300 of FIGS. 3A and 3B except where otherwise noted. In particular, the core 400 includes a first subassembly 302(1), a second subassembly 302(2) in optical communication with the first subassembly 302(1), a connector sleeve 404, a mounting ring 306, and a functional layer 307 positioned in the connector sleeve 404 between the first subassembly 302(1) and the second subassembly 302(2).

As noted above, the connector sleeve 404 includes a first end 320A, a second end 320B opposite the first end 320A, and a sleeve channel 322 extending therebetween. The connector sleeve 404 further includes a first portion 406(1) proximate the first end 320A and a second portion 406(2) proximate the second end 320B. The first portion 406(1) and the second portion 406(2) are radially offset by a distant D from one another. In other words, the first portion 406(1) and the second portion 406(2) are not axially aligned with one another.

The first subassembly 302(1) is positioned within the first portion 406(1) of the connector sleeve 404, and the second subassembly 302(2) is positioned within the second portion 406(2) of the connector sleeve 404. Accordingly, the first axis A(1) of the first subassembly 302(1) is radially offset from the second axis A(2) of the second subassembly 302(2). Further, the first fiber 314(1) within the first ferrule 312(1) is radially offset from the second fiber 314(2) in the second ferrule 312(2) by a distance D to attenuate propagation of the transmission signal $\lambda_T$ between the first fiber 314(1) and the second fiber 314(2). Offsetting the axial alignment of the first fiber 314(1) and the second fiber 314(2) can attenuate the signal (e.g., tune power) transmitted between the first fiber 314(1) and the second fiber 314(2). The greater the offset distance D, the greater the attenuation of the propagated signal. In certain embodiments, the coupling efficiency between the first ferrule 312(1) and the second ferrule 312(2) is customized by this offset and the signal attenuation is well controlled.

In other embodiments, the first ferrule 312(1) and the second ferrule 312(2) are axially aligned, but the second fiber 314(2) is radially offset within the second ferrule 312(2) such that the first ferrule 312(1) and the second ferrule 312(2) are offset.

Figure 4B:
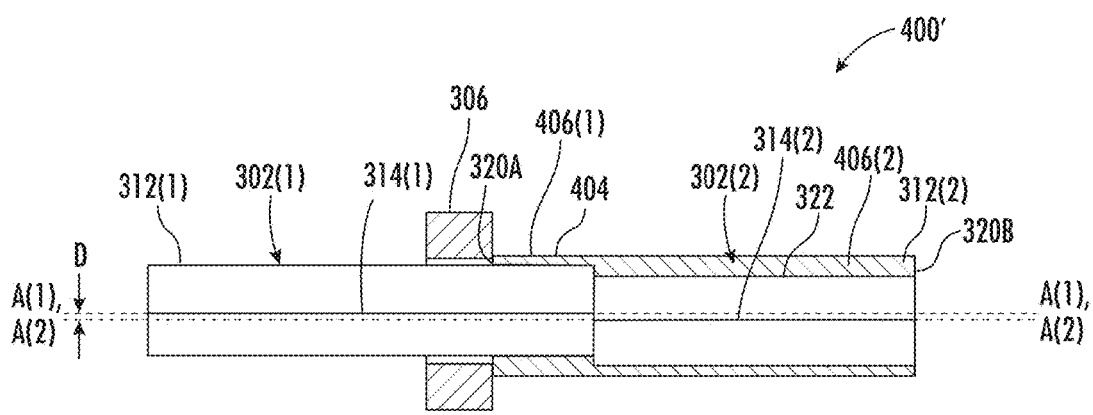
FIG. 4B is a cross-sectional top view of another embodiment of the core of FIG. 4A without a functional layer.

FIG. 4B is a cross-sectional top view of a core 400' that is similar to the core 400 of FIG. 4A but does not include the functional layer 307. The core 400' is similar to the core 400 of FIG. 4A except where otherwise noted. In particular, the functional layer 307 is omitted. As in FIG. 4A, the first fiber 314(1) within the first ferrule 312(1) is radially offset from the second fiber 314(2) in the second ferrule 312(2) by a distance D to attenuate propagation of the transmission signal $\lambda_T$ between the first fiber 314(1) and the second fiber 314(2). Without the functional layer 307, the first ferrule 312(1) can directly contact the second ferrule 312(2) such that a distance between the first ferrule 312(1) and the second ferrule 312(2) is nominal (e.g., about 0 mm or close thereto).

Figure 5:
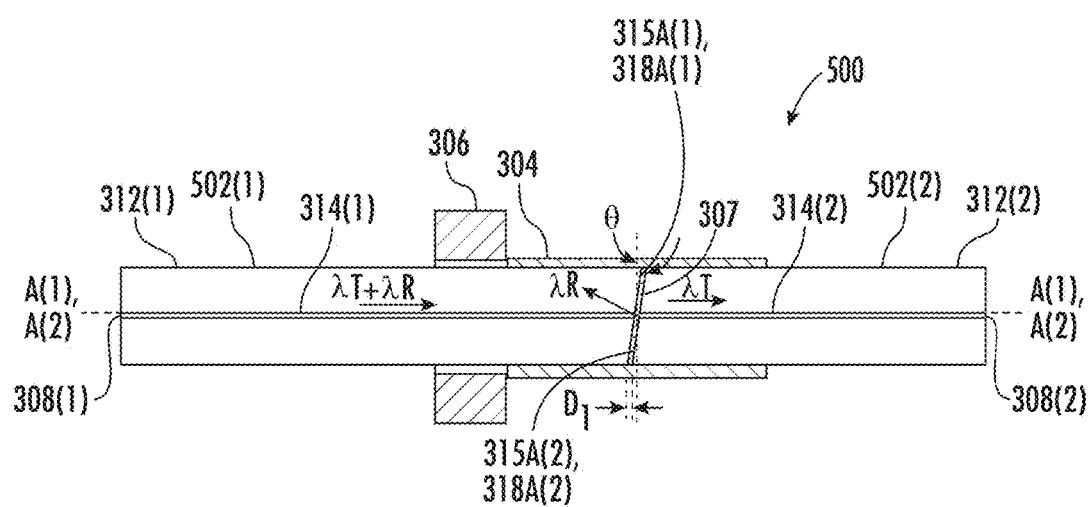
FIG. 5 is a cross-sectional top view of another embodiment of the core of FIGS. 3A and 3B with an angled interface between the first and second optical fibers.

FIG. 5 is a cross-sectional top view of another embodiment of a core 500 that is similar to the core 300 of FIGS. 3A and 3B but has an angled interface between the first and second optical fibers 314(1), 314(2). The core 500 is similar to the core 300 of FIGS. 3A and 3B except where otherwise noted. In particular, the core 500 includes a first subassembly 502(1), a second subassembly 502(2) in optical communication with the first subassembly 502(1), a connector sleeve 304, a mounting ring 306, and a functional layer 307 positioned in the connector sleeve 304 between the first subassembly 502(1) and the second subassembly 502(2).

A first end face 318A(1) at the first medial end 315A(1) of the first ferrule 312(1) (and the first fiber 314(1)) is generally non-perpendicularly angled by angle θ (e.g., 8°) to a first axis A(1) of the first ferrule 312(1) (and the first fiber 314(1)). A second end face 318A(2) at the second medial end 315A(2) of the second ferrule 312(2) (and the second fiber 314(2)) is generally non-perpendicularly angled (by angle θ) to a second axis A(2) of the second ferrule 312(2) (and the second fiber 314(2)).

In operation, as an example, a multiplexed optical signal may include a first signal (a transmission signal $\lambda_T$) and a second signal (a reflection signal $\lambda_R$). The functional layer 307 is configured to allow propagation of the transmission signal $\lambda_T$ from a first port 308(1) to the first fiber 314(1) and through the functional layer 307 to the second fiber 314(2) to the second port 308(2). The functional layer 307 is also configured to block or reflect the reflection signal $\lambda_R$, for example, by reflecting it to a fiber optic attenuator (FOA). In other words, the functional layer 307 routes sub-signals of a multiplexed signal between the first port 308(1) and second port 308(2).

The functional layer 307, the first medial end 315A(1) of the first ferrule 312(1), and the second medial end 315A(2) of the second ferrule 312(2) are non-perpendicular to the first axis A(1) of the first ferrule 312(1) and the second axis A(2) of the second ferrule 312(2). As a result, when the reflection signal 6A is reflected by the functional layer 307, the reflection signal $\lambda_R$ is not transmitted back through the first fiber 314(1). Instead, the reflection signal $\lambda_R$ is reflected away from the first fiber 314(1) (in other words, external to the first fiber 314(1)) to block the reflection signal $\lambda_R$ from transmitting. In certain embodiments, one or more two-port devices (e.g., FOA) are used to attenuate signals by blocking these reflection signals $\lambda_R$. The configuration of the core 500 can be used for signal blocking and/or signal attenuation, or other uses.

Figure 6A:
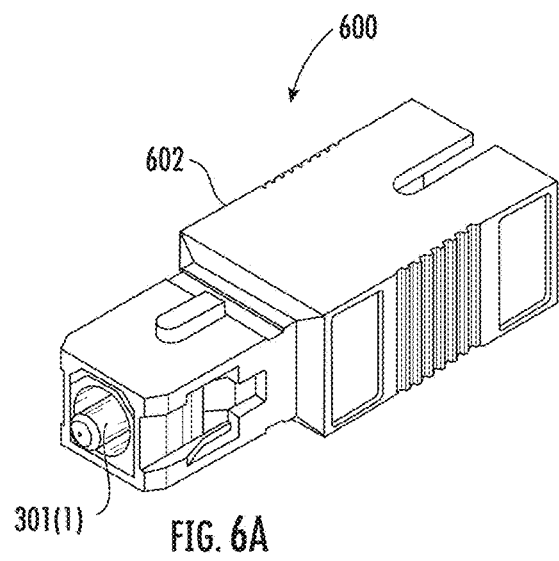
FIG. 6A is a perspective view of a two-port device including the core of FIGS. 3A and 3B.
Figure 6B:
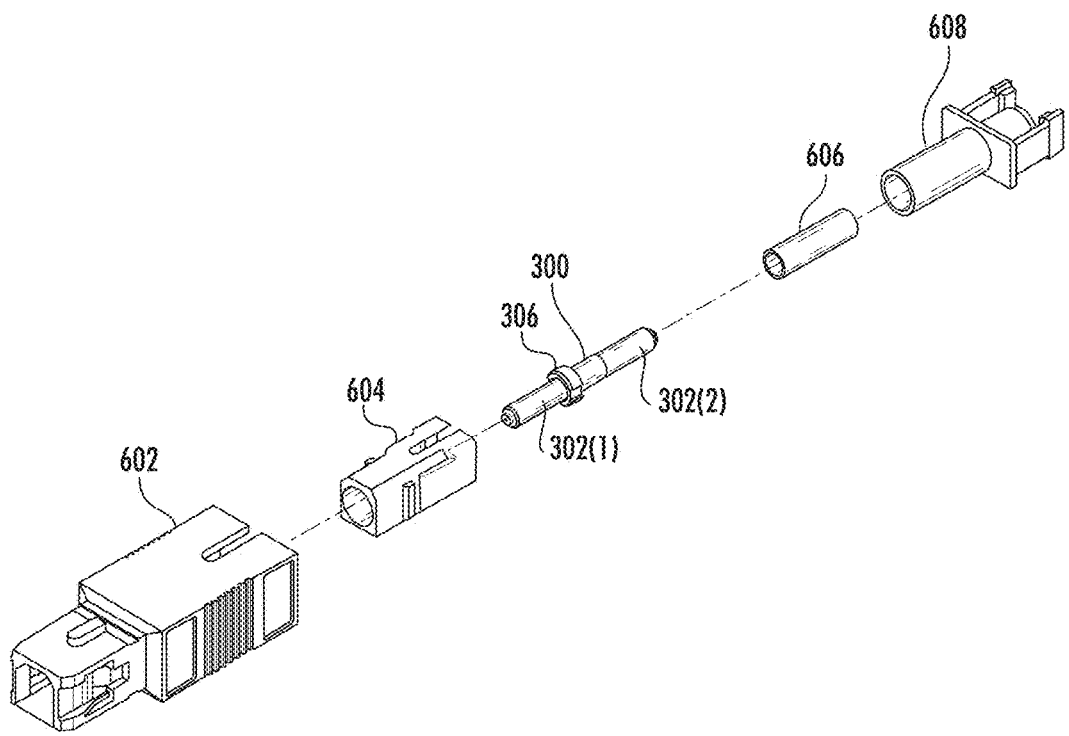
FIG. 6B is an exploded perspective view of the two-port device of FIG. 6A.

FIGS. 6A and 6B are views of a two-port device 600 including the core 300 of FIGS. 3A-3B. However, it is noted that the two-port device 600 could instead include the core 400 or core 500 of FIGS. 4 and 5, respectively. The two-port device 600 (e.g., pluggable two-port device) includes a housing 602, an outer shell 604, the core 300 (may also be referred to herein as a ferrule body), the sleeve 606, and a spring lever attachment 608. In particular, at least a portion of the first subassembly 302(1) of the core 300 is positioned in the outer shell 604, the housing 602 or both the outer shall 604 and the housing 602. The mounting ring 306 mounts the core 300 within the outer shell 604, the housing 602 or both the outer shell 604 and the housing 602. The outer shell 604, the first subassembly 302(1) or the outer shell and the first subassembly 302(1) are positioned within the housing 602. At least a portion of the second subassembly 302(2) of the core 300 is positioned in the sleeve 606. At least a portion of the sleeve 606, the second subassembly 302(2) or the sleeve and the second subassembly 302(2) is positioned within the spring lever attachment 608. The spring lever attachment 608 is mechanically attached to the housing 602 to contain the outer shell 604, the core 300, and the sleeve 606 within the housing 602.

The two-port device 600 could be used as a device core engine in multiple scenarios (e.g., wavelength demultiplexing, signal blocking, isolation, and/or power attenuation, etc.).

In certain embodiments, the two-port device 600 is a pluggable device with connector interfaces (e.g., SC connector (e.g., subscriber connector, square connector, standard connector, etc.), LC connector (little connector, lucent connector, local connector), FC connector (ferrule connector, fiber channel), ST connector (straight tip connector) or MU connector (miniature unit), etc.) on either port. In certain embodiments, the end surface could be PC (physical contact), UPC (ultra physical contact), or APC (angled physical contact) customized. For example, in certain embodiments, the end surface has an APC surface of 8°.

The two-port device 600 disclosed herein is easily manufactured, easy to use, and has a compact form factor. As an example, the two-port device may be used for new deployment, diagnosis, and/or upgrade of PON (passive optical network) within FTTH (fiber to the home) solutions.

The two-port device 600 provides low insertion loss, simplicity in assembly, and low cost manufacturing due a simplified structure. In certain embodiments, the build of the device is simplified and the optical path is simplified so that the two-port device 600 is more cost effective and provides a better optical performance. In certain embodiments, the two-port device 600 provides low insertion los, such as due to the straight optical path within the ceramic ferrule (and/or simple optical structure).

Figure 7:
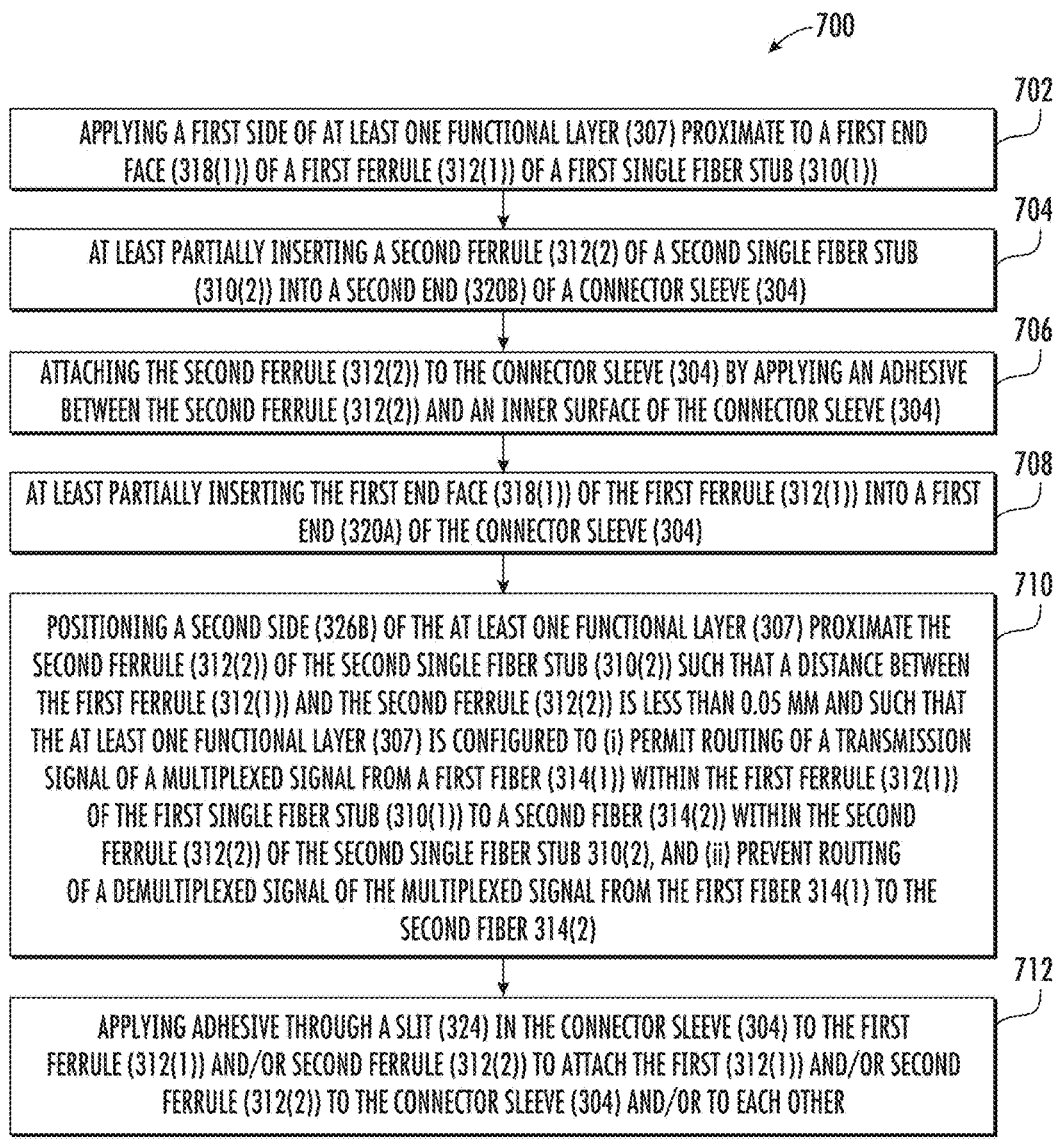
FIG. 7 is a flowchart of steps for manufacturing a two-port device of FIGS. 3A-6B.

FIG. 7 is a flowchart illustrating a method 700 for manufacturing a two-port device of FIGS. 3A-6B. Reference is made to core 300 of FIGS. 3A and 3B specifically, although the steps 700 also apply to cores 400 and 500 of FIGS. 4 and 5. In step 702, a first side of at least one functional layer 307 is applied proximate to a first end face 318(1) of a first ferrule 312(1) of a first single fiber stub 310(1). In step 704, a second ferrule 312(2) of a second single fiber stub 310(2) is at least partially inserted into a second end 320B of a connector sleeve 304. In step 706, the second ferrule 312(2) is attached to the connector sleeve 304 by applying an adhesive (e.g., glue, thin film glue, etc.) between the second ferrule 312(2) and an inner surface of the connector sleeve 304. In step 708, the first end face 318(1) of the first ferrule 312(1) is at least partially inserted into a first end 320A of the connector sleeve 304. In step 710, a second side 326B of the at least one functional layer 307 is positioned proximate the second ferrule 312(2) of the second single fiber stub 310(2) such that a distance $D_1$ between the first ferrule 312(1) and the second ferrule 312(2) is less than about 0.05 mm (in other embodiments, the distance may be less than about 0.03 mm, less than about 0.01 mm, or less than about 0.001 mm, or directly contacting) and such that the functional layer 307 is configured to: (i) permit routing of a transmission signal of a multiplexed signal from a first fiber 314(1) within the first ferrule 312(1) of the first single fiber stub 310(1) to a second fiber 314(2) within the second ferrule 312(2) of the second single fiber stub 310(2), and (ii) prevent routing of a non-transmission signal (also called a demultiplexed signal or a second signal) of the multiplexed signal from the first fiber 314(1) to the second fiber 314(2). In step 712, an adhesive (e.g., glue, thin film glue, etc.) is applied through a slit 324 in the connector sleeve 304 to the first ferrule 312(1) and/or second ferrule 312(2) to attach the first ferrule 312(1) and/or second ferrule 312(2) to the connector sleeve 304 and/or to each other.

It is noted that the connector sleeve 304, the first single fiber stub 310(1), the second single fiber stub 310(2), and the functional layer 307 could be assembled in other various ways and orders. For example, the second ferrule 312(2) could be inserted into the connector sleeve 304 after the first ferrule 312(1) and the functional layer 307 are inserted into the connector sleeve 304.

It will be apparent to those skilled in the art that various modifications and variations can be made without departing from the spirit or scope of the invention. Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A device for multiplexing, comprising:
   a housing; and
   a core at least partially positioned within the housing, the core comprising:
   a first single fiber stub comprising a first ferrule and a first fiber at least partially positioned within the first ferrule, the first fiber configured for optical communication of a multiplexed signal comprising a transmission signal and a non-transmission signal;
   a second single fiber stub comprising a second ferrule and a second fiber at least partially positioned within the second ferrule, the second fiber configured for optical communication of the transmission signal; and
   at least one functional layer positioned between the first fiber and the second fiber;
   wherein the at least one functional layer is configured to: (i) permit routing of the transmission signal of the multiplexed signal along an optical path from the first fiber to the second fiber, and (ii) prevent routing of the non-transmission signal of the multiplexed signal along the optical path from the first fiber to the second fiber; and
   wherein a distance between the first ferrule and the second ferrule is less than about 1 micron.

2. The device of claim 1, wherein the core further comprises a sleeve, at least a portion of the first ferrule positioned within the sleeve and at least a portion of the second ferrule positioned within the sleeve.

3. The device of claim 1, wherein the first single fiber stub comprises a first port and the second single fiber stub comprises a second port, and wherein the core comprises no more than two ports.

4. The device of claim 1, wherein the first ferrule abuts a first side of the at least one functional layer, and the second ferrule abuts a second side of the at least one functional layer.

5. The device of claim 1, wherein the at least one functional layer is attached to the first ferrule.

6. The device of claim 1, wherein the at least one functional layer is deposited onto the first ferrule.

7. The device of claim 1, wherein the at least one functional layer comprises at least one WDM filter having a passband to filter the multiplexed signal by wavelength.

8. The device of claim 1, wherein the at least one functional layer comprises at least one tap filter to filter the multiplexed signal by optical intensity.

9. The device of claim 1, wherein the optical path between the first fiber and the second fiber is devoid of a collimating element.

10. The device of claim 1, wherein the optical path between the first fiber and the second fiber is devoid of at least one of a collimating lens or a gradient index fiber segment.

11. The device of claim 1, wherein the at least one functional layer is configured to reflect the non-transmission signal of the multiplexed signal in a reverse direction in the first fiber.

12. The device of claim 11, wherein a first end face of the first ferrule is perpendicular to a longitudinal axis of the first ferrule.

13. The device of claim 1, wherein the at least one functional layer is configured to reflect the non-transmission signal of the multiplexed signal away from the first fiber.

14. The device of claim 13, wherein a first end face of the first ferrule is non-perpendicular to a longitudinal axis of the first ferrule.

15. The device of claim 1, wherein the first fiber is radially offset from the second fiber to attenuate propagation of the transmission signal between the first fiber and the second fiber.

16. The device of claim 1, wherein the first fiber is axially aligned with the second fiber.

17. A device for multiplexing, comprising:
a first ferrule having a first optical fiber configured for optical communication of a multiplexed signal comprising a transmission signal and a non-transmission signal;
a second ferrule having a second optical fiber configured for optical communication of the transmission signal; and
at least one functional layer positioned between the first optical fiber and the second optical fiber, the at least one functional layer configured to: (i) permit routing of the transmission signal of the multiplexed signal along an optical path from the first optical fiber to the second optical fiber, and (ii) prevent routing of the non-transmission signal of the multiplexed signal along the optical path from the first optical fiber to the second optical fiber;
wherein a distance between the first ferrule and the second ferrule is less than about 1 micron.

18. The device of claim 17, wherein the optical path is devoid of a collimating element.

19. A method of forming a compact device for multiplexing and demultiplexing, comprising:
positioning a first fiber stub proximate a first side of a functional layer, wherein the first fiber stub comprises a first ferrule and a first fiber at least partially positioned within the first ferrule, the first fiber configured for optical communication of a multiplexed signal comprising a transmission signal and a non-transmission signal; and
positioning a second fiber stub proximate a second side of the functional layer, the second fiber stub comprising a second ferrule and a second fiber at least partially positioned within the second ferrule, the second fiber configured for optical communication of the transmission signal, wherein a distance between the first ferrule and the second ferrule is less than about 1 micron and the functional layer is configured to: (i) permit routing of the transmission signal of the multiplexed signal from the first fiber within the first ferrule to the second fiber within the second ferrule, and (ii) prevent routing of the non-transmission signal of the multiplexed signal from the first fiber to the second fiber.

20. The method of claim 19,
further comprising peeling the functional layer off of a filter; and
wherein the positioning of the first fiber stub proximate the first side of the functional layer comprises applying the peeled off functional layer to a first end face of the first fiber stub.

21. The method of claim 20, further comprising:
at least partially inserting the second fiber stub into a connector sleeve such that the connector sleeve frictionally engages the second ferrule of the second fiber stub;
applying an adhesive between the second ferrule and an inner surface of the connector sleeve;
at least partially inserting the first fiber stub into the connector sleeve such that the connector sleeve frictionally engages the first ferrule of the first fiber stub; and
applying an adhesive, through a slit in the connector sleeve, to the first ferrule and the second ferrule to connect the first ferrule and the second ferrule to the connector sleeve.

22. The device of claim 1, wherein the at least one functional layer comprises a single film.

23. The device of claim 1, wherein the at least one functional layer is bi-directional such that:
the second fiber is further configured for optical communication of a second multiplexed signal comprising a second transmission signal and a second non-transmission signal;
the first fiber is further configured for optical communication of the second transmission signal; and
the at least one functional layer is further configured to: (i) permit routing of the second transmission signal of the second multiplexed signal along a second optical path from the second fiber to the first fiber, and (ii) prevent routing of the second non-transmission signal of the second multiplexed signal along the optical path from the second fiber to the first fiber.

24. The device of claim 14, wherein the first end face of the first ferrule is non-perpendicular by an angle of eight degrees to the longitudinal axis of the first ferrule.

* * * * *